(12) United States Patent
Wang et al.

(10) Patent No.: US 12,544,875 B2
(45) Date of Patent: Feb. 10, 2026

(54) MULTI-TIP TOOLING DESIGN FOR ULTRASONIC IMPACT GRINDING OF CMCs

(71) Applicant: Raytheon Technologies Corporation, Farmington, CT (US)

(72) Inventors: Zhigang Wang, South Windsor, CT (US); Andrzej E. Kuczek, Bristol, CT (US); Gajawalli V. Srinivasan, South Windsor, CT (US); Robin H. Fernandez, East Haddam, CT (US); John D. Riehl, Hebron, CT (US); Alan C. Barron, Jupiter, FL (US); Ahmed Abdillahi Abdi, Oceanside, CA (US); Jason Nelson, Puyallup, WA (US); Andrew Joseph Lazur, La Jolla, CA (US)

(73) Assignee: RTX Corporation, Farmington, CT (US)

( * ) Notice: Subject to any disclaimer, the term of this patent is extended or adjusted under 35 U.S.C. 154(b) by 272 days.

(21) Appl. No.: 18/099,491

(22) Filed: Jan. 20, 2023

(65) Prior Publication Data

US 2024/0246193 A1   Jul. 25, 2024

(51) Int. Cl.
  *B24B 1/04* (2006.01)
  *B06B 3/00* (2006.01)
  *B24B 41/00* (2006.01)
  *B24C 5/00* (2006.01)
  *B26D 7/08* (2006.01)

(52) U.S. Cl.
  CPC .............. *B24B 41/002* (2013.01); *B24B 1/04* (2013.01); *B24C 5/005* (2013.01); *B06B 3/00* (2013.01); *B26D 7/086* (2013.01)

(58) Field of Classification Search
  CPC .. B24B 1/04; B06B 1/06; B26D 7/086; B24C 5/005; B26F 1/24
  See application file for complete search history.

(56) References Cited

U.S. PATENT DOCUMENTS

| RE28,642 | E | 12/1975 | Davis |
| 6,343,495 | B1 * | 2/2002 | Cheppe ................ B24C 5/08 |
| | | | 72/710 |
| 7,344,620 | B2 | 3/2008 | Jung |
| | | (Continued) | |

FOREIGN PATENT DOCUMENTS

| GB | 2167270 A * | 5/1986 | .............. B06B 3/00 |
| KR | 20180010532 A * | 1/2018 | |

OTHER PUBLICATIONS

KR-20180010532-A English Translation (Year: 2018).*
Extended European Search Report For European Patent Application No. 23219499.3, Dated Jun. 3, 2024, 9 Pages.

*Primary Examiner* — Makena S Markman
(74) *Attorney, Agent, or Firm* — Kinney & Lange, P.A.

(57) ABSTRACT

A tool for ultrasonic impact grinding apparatus driven to vibrate along a longitudinal axis at an applied operating frequency includes a tool body disposed on the longitudinal axis, a first tip extending from an output end of the tool body, and a second tip extending in parallel to the first tip from the output end of the tool body. The first tip has a first length. The second tip has a second length greater than the first length. A mass of the first and second tip is substantially balanced across the output end of the tool body and with respect to the longitudinal axis.

18 Claims, 5 Drawing Sheets

(56) References Cited

U.S. PATENT DOCUMENTS

| | | |
|---|---|---|
| 9,890,647 B2 | 2/2018 | Chamberlain et al. |
| 2021/0114309 A1* | 4/2021 | Beach ................. B29C 66/8145 |
| 2021/0260713 A1* | 8/2021 | Song ......................... B26F 1/24 |

* cited by examiner

MULTI-TIP TOOLING DESIGN FOR ULTRASONIC IMPACT GRINDING OF CMCs

BACKGROUND

The present disclosure relates generally to machining ceramic matrix composites (CMCs) and, more particularly, to ultrasonic impact grinding (UIG).

Lightweight ceramic matrix composites (CMC) are highly desirable materials for gas turbine engine applications. CMCs, and particularly SiC/SiC CMCs (having silicon carbide matrix and fibers) exhibit excellent physical, chemical, and mechanical properties at high temperatures, making them particularly desirable for producing hot section components, including blade outer air seals (BOAS), vanes, blades, combustors, and exhaust structures. Like other materials, it can be critical to the performance, durability, and function of the CMC component to cool the CMC component to maintain appropriate operating temperatures. Features for mitigating thermal stresses can include cooling channels provided through the material. There have been challenges in developing an efficient and cost-effective way to machine CMCs with high quality. SiC/SiC CMCs have a hardness second only to that of diamond tooling and the SiC fiber reinforced phase results in anisotropy and heterogencity.

UIG has been used to fabricate complex hole shapes with high aspect ratios on hard and brittle materials, such as CMCs. In UIG, electrical energy input to a transducer is converted to mechanical vibrations along a longitudinal axis at high frequency (usually at 20-40 kHz). The excited vibration is subsequently transmitted through an energy-focusing horn to amplify the vibration amplitude which is delivered to a tool tip. Thus, the tool, which locates directly above a workpiece, can vibrate along its longitudinal axis with a desired amplitude. An abrasive slurry comprising a mixture of abrasive material (e.g., diamond, boron carbide, etc.) suspended in water or oil is provided constantly into the machining area. The vibration of the tool causes the abrasive particles held in the slurry between the tool and the workpiece to impact the workpiece surface causing material removal by microchipping. Since actual machining is carried out by abrasive particles, the tool can be softer than the workpiece.

The UIG process has matured to offer true three-dimensional machining capability to process a wide variety of engineering materials including ceramics and hard metals. An important application of UIG is for drilling through holes and blind holes and for machining of slots and pockets. Hole drilling always stands as the most popular machining process for product manufacturing, and UIG shows a high potentiality in fabricating diverse holes, especially those with small diameters and high aspect ratios on hard and brittle materials, such as CMCs. However, despite all favorable attributes of UIG, its application has been limited due to very low material removal rates.

SUMMARY

In one aspect, a tool for ultrasonic impact grinding apparatus driven to vibrate along a longitudinal axis at an applied operating frequency includes a tool body disposed on the longitudinal axis, a first tip extending from an output end of the tool body, and a second tip extending in parallel to the first tip from the output end of the tool body. The first tip has a first length. The second tip has a second length greater than the first length. A mass of the first and second tip is substantially balanced across the output end of the tool body and with respect to the longitudinal axis.

In another aspect, a tool for an ultrasound impact grinding apparatus driven to vibrate along a longitudinal axis at an applied operating frequency includes a tool body disposed on the longitudinal axis and a plurality of tips connected to an output end of the body. Each tip of the plurality of tips has a different length and a vibration amplitude of the plurality of tips is substantially uniform at the applied operating frequency.

In yet another aspect, a method of conducting ultrasonic impact griding includes orienting a tool of an ultrasonic impact grinding apparatus at an angle relative to a workpiece and providing a uniform vibrational amplitude to all tips of the tool. The tool has a longitudinal axis and a plurality of tips of differing lengths. The ends of the tips are disposed an equal distance from a surface of the workpiece.

The present summary is provided only by way of example, and not limitation. Other aspects of the present disclosure will be appreciated in view of the entirety of the present disclosure, including the entire text, claims and accompanying figures.

Figure 1:
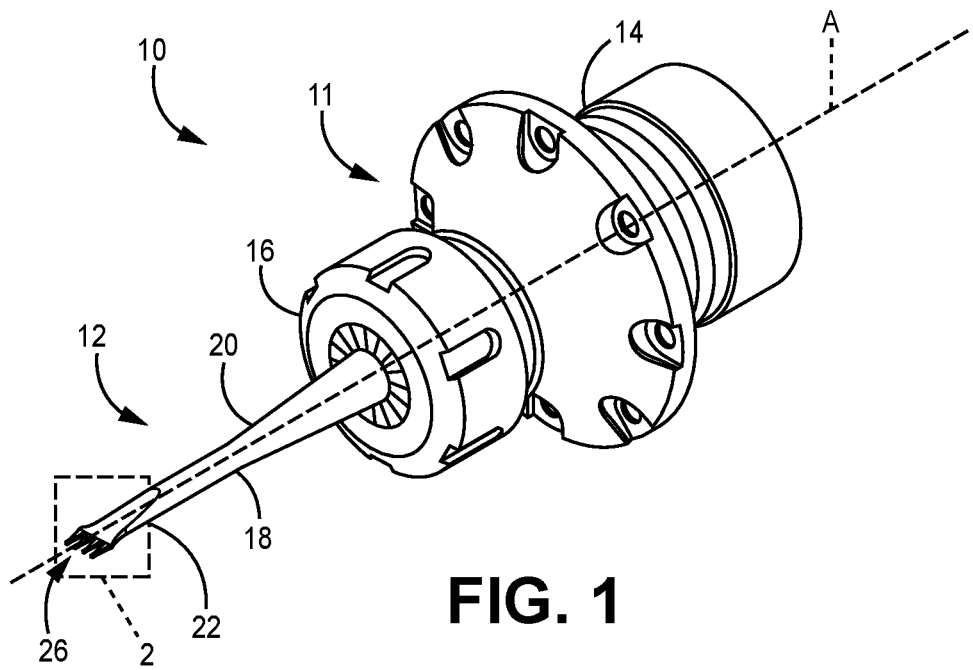
FIG. 1 is a perspective view of an ultrasonic impact grinding apparatus incorporating one embodiment of a multi-tip tool.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

One way to improve productivity and yield of UIG is to machine multiple features simultaneously with a specially designed tooling. The present disclosure is directed to UIG tooling with multiple tips to increase number of features or holes that can be machined at the same time. For efficient operation, tools can be designed to achieve a substantial uniform vibration amplitude along a base of a tool body such that all tips attached to the tool body will have an equal input amplitude. Likewise, each tip can be designed to achieve a substantially uniform output vibration amplitude at an output surface. As used herein, the term substantially uniform vibration amplitude can include variation up to 10 percent. If the amplitude is nonuniform and distributed along the surface, for example, in a curved manner, attached tools will be excited in a combined longitudinal and bending vibrational mode. Tool vibration at the bending mode can cause excess stress on and failure of the tool. As such, it is important to design each tool tip with a specified amplitude gain and a predetermined length at a certain expected operating frequency.

Figure 2:
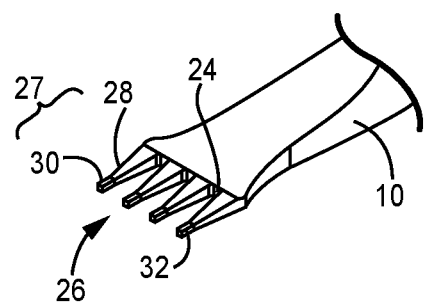
FIG. 2 is an enlarged view of the multi-tip tool of FIG. 1.
Figure 3:
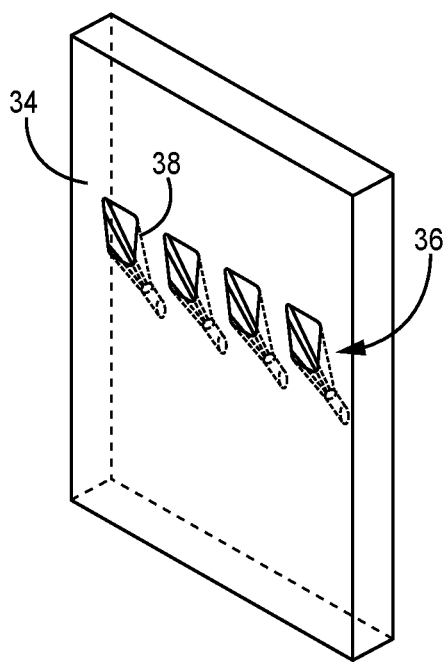
FIG. 3 is a perspective view of a workpiece having through holes formed by the multi-tip tool of FIG. 1.

FIG. 1 is a perspective view of UIG assembly 10 having multi-tip tool 12. UIG assembly 10 is configured to simultaneously machine a plurality of holes in a CMC workpiece. FIG. 2 is an enlarged view of multi-tip tool 12. FIG. 3 is a perspective view of a workpiece having through holes formed by UIG assembly 10. FIGS. 1-3 are discussed together herein. UIG assembly 10, UIG apparatus 11, multi-tip tool 12, transducer 14, collet 16, tool body 18, horn 20, end portion 22, output base 24, tips 26, shaping portion 27, diffuser portion 28, metering portion 30, terminal end 32, workpiece 34, holes 36, diffuser 38, and longitudinal axis A are shown. UIG apparatus 11 can be any conventional ultrasonic machining apparatus or variation thereof configured for operation with a tool for ultrasonic impact grinding with a slurry of abrasive particles. Collet 16 is adapted to receive and retain multi-tip tool 12. Electrical energy input to transducer 14 is converted to mechanical vibrations along longitudinal axis A at high frequency (usually 20-40 kHz). Transducer 14 transmits the vibrational energy to multi-tip tool 12 when UIG apparatus 11 is in use. Multi-tip tool 12 includes tool body 18, horn 20, end portion 22, output base 24, and tips 26. Horn 20 is disposed at one end of tool body 18 adjacent to collet 16. Tips 26 are disposed at an opposite end of tool body 18. Tips 26 extend from output base 24, which is disposed at a terminal end of end portion 22. Tips can include shaping portion 27 configured to define a shape of holes 36 in workpiece 34. Shaping portions 27 can include diffuser portion 28 disposed adjacent to output base 24 and metering portion 30 extending to terminal end 32.

Tool body 18 is a sonotrode configured to vibrate along longitudinal axis A at a desired amplitude and at a frequency usually around 20-40 kHz. Vibration of tips 26 transmits energy to propel abrasive particles in the slurry at high velocity between tips 26 and workpiece 34. Horn 20 and end portion 22 have converging portions configured to amplify a vibration amplitude delivered to tips 26. Multi-tip tool 12 can be configured to vibrate along longitudinal axis A at an amplitude of approximately 50 percent of an average particle size of the abrasive particles used in operation. Multi-tip tool 12 is configured to provide a substantially uniform vibration amplitude across output base 24 such that all tips 26 have a substantially equal input amplitude. The number of tips 26 and spacing of tips 26 can be selected based on the targeted number and spacing of features to be machined. The number of tips 26 and spacing of tips 26 can be limited to maintain a substantially uniform vibration amplitude across all tips 26 and to meet a target amplitude. For example, in applications having a target amplitude between 20 to 50 microns, a total tip span can be limited to less than about 1.5 inches to maintain uniformity of vibration amplitude on all tips 26.

Tips 26 can be of uniform length and size and uniformly spaced across output base 24, as shown in FIGS. 1 and 2, to substantially balance a mass distribution across output base 24 and with respect to longitudinal axis A. The substantially balanced mass achieves a substantially uniform vibration amplitude at the output surface (terminal ends 32 of tips 26). Tips 26 are disposed in parallel and parallel to longitudinal axis A. In operation, multi-tip tool 12 is configured to be positioned relative to workpiece 34 such that all tips 26 are positioned at a uniform height above workpiece 34 to allow for simultaneous machining of holes 36.

Tips 26 can be removably fastened to output base 24 (e.g., via threaded connection) to allow replacement of tips 26. Tips 26 can have any shape known in the art. As shown in FIGS. 2 and 3, tips 26 can have a laidback-type diffuser portion 28 to form a laidback fan-shaped hole 36 as known in the art. Tips 26 can include metering portion 30, which extends from diffuser portion 28 to the output surface (terminal end 32). Diffuser portion 28 can have a polyhedral shape with a trapezoidal output base converging toward metering portion 30. Metering portion 30 can be cylindrical. Other tip shapes are contemplated including, but not limited to, tips having a conical diffuser portion, lobed diffuser portion, or Vehr type diffusion portion, as known in the art. Terminal end 32 can be angled to such that the output surface of terminal end 32 is disposed in a plane substantially parallel to a surface of workpiece 34.

As shown in FIGS. 1 and 2, output base 24 can have a substantially rectangular shape sized to substantially match a combined perimeter of tips 26 at output base 24. Tips 26 are uniformly spaced across output base 24 to substantially balance the mass across output base 24 and provide a substantially uniform vibration amplitude at the output surface (terminal ends 32). Output base 24 can have other shapes and sizes depending on the number and arrangement of tips 26. For example, tips 26 can be arranged in a single row as shown in FIGS. 1 and 2 or in multiple rows (Sec, e.g., FIGS. 8 and 9). The arrangement of tips 26 can be selected based on the arrangement of features to be machined. The number of tips 26 is not limited to the embodiments shown. The number of tips 26 is generally limited by the size of tool body 18 required to provide a desired output amplitude at tips 26 and a desired hole size. For example, for a 1-inch size output base the number of tool tips can vary from about 3 to 30. Typically, cooling holes have a diameter ranging from 0.014 inches to 0.028 inches. Tips 26 are arranged to provide a substantially uniform mass distribution across output base 24 to provide substantially uniform vibration amplitude at the output surface (terminal ends 32). Unbalanced mass distribution can result in bending mode vibration, which can lead to failure of tips 26 and/or multi-tip tool 12. It will be understood that multi-tip tool 12 includes at least two tips disposed on opposite ends of output base 24 and that any additional tips 26 provided therebetween are uniformly spaced to balance the mass across output base 24.

End portion 22 can be shaped to provide a transition between a cylindrical portion of tool body 18 and output base 24. As shown in FIGS. 1 and 2, material can be removed from opposite sides of tool body 18 in a manner providing end portion 22 with planar walls converging toward output base 24. Additional material can be added between planar walls forming portions that diverge from tool body 18 to edges of output base 24. End portion 22 can further amplify the vibration amplitude output at output base 24. A shape of end portion 22 can vary based on a shape of output base 24 and is not limited to the shapes disclosed herein.

Workpiece 34 can be formed of a CMC material. Workpiece 34 can be, for example, a SiC/SiC CMC having silicon carbide fibers disposed in a silicon carbide matrix. While the disclosed multi-tip tool 12 is particularly suited for improving the efficiency and throughput of CMC manufacturing, it is not limited to use on CMC workpiece or particular CMC materials. Workpiece 34 can be a component of a gas turbine engine. For example, workpiece 34 can be a BOAS, vane, blade, combustor, exhaust structure configured for use at high temperatures.

Figure 4:
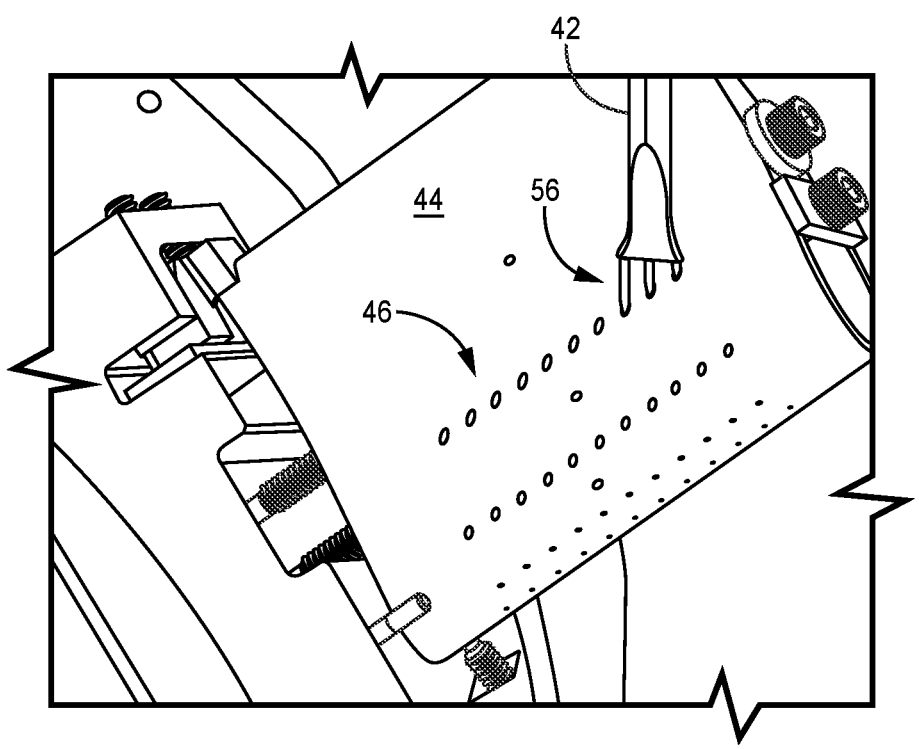
FIG. 4 is a perspective view of another embodiment of an ultrasonic grinding apparatus incorporating a multi-tip tool positioned for machining holes in a workpiece.

In some manufacturing processes, it is not possible to align a metering hole axis to the longitudinal axis of the multi-tip tool while maintaining a uniform distance between each tool tip and the workpiece. For example, as shown in FIG. 4, it may be necessary to orient a tool such that the output base of the tool (portion to which tips are attached) is angled with respect to a workpiece surface. If tips are of equal length, some tips will be substantially spaced from the workpiece surface during operation. To allow for simultaneous machining of multiple holes, tips of differing lengths can be provided.

Figure 5:
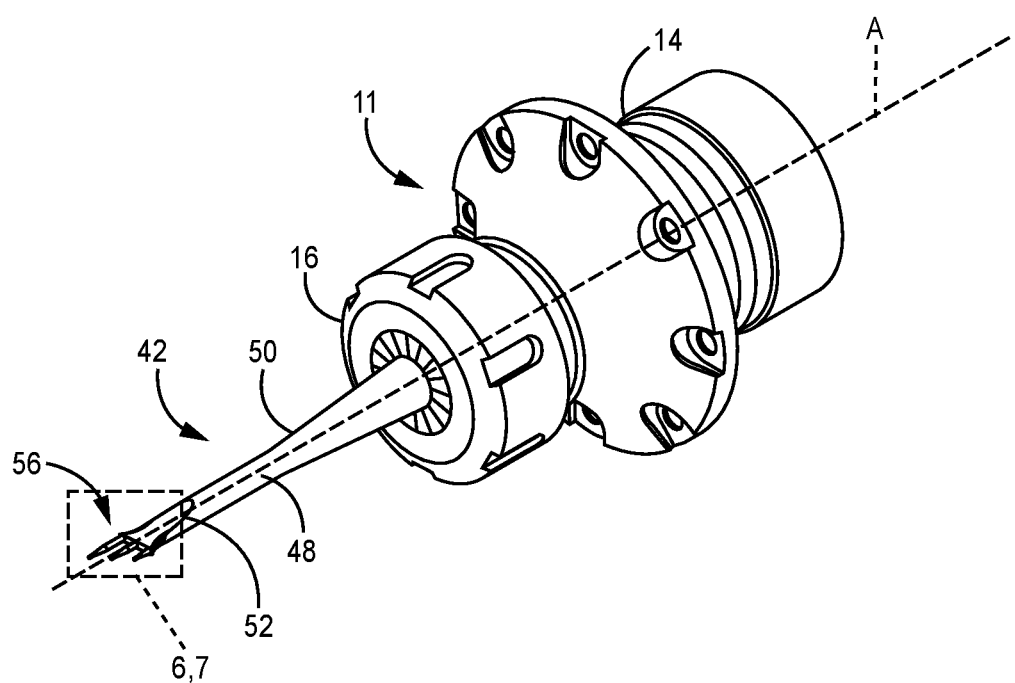
FIG. 5 is a perspective view of the multi-tip tool of FIG. 4.
Figure 6:
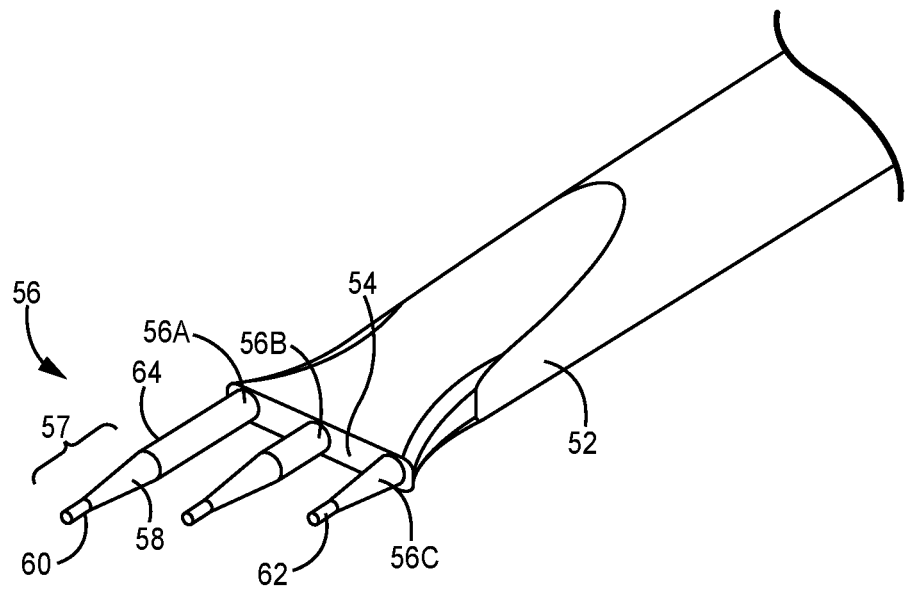
FIG. 6 is an enlarged view of one embodiment of tips of the multi-tip tool of FIG. 5.
Figure 7:
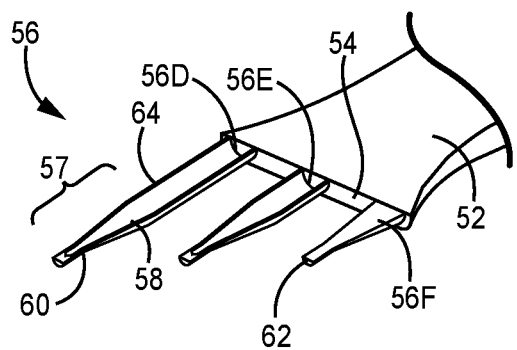
FIG. 7 is a simplified cross-sectional view of another embodiment of tips of the multi-tip tool FIG. 5.

FIG. 4 is a perspective view multi-tip tool 42 positioned for machining holes in workpiece 44. FIG. 5 is a perspective view of multi-tip tool 42 of FIG. 4. FIG. 6 is an enlarged view of one embodiment of tips of multi-tip tool 42 of FIG. 5. FIG. 7 is a simplified cross-sectional view of another embodiment of tips of multi-tip tool 42 of FIG. 5. FIGS. 5-7 are discussed together herein. Multi-tool tip 42, workpiece 44, holes 46, tool body 48, horn 50, end portion 52, output base 54, tips 56, shaping portions 57, diffuser portions 58, metering portions 60, terminal ends 62, extension portions 64, and longitudinal axis A are shown. Multi-tip tool 42 can be used with UIG apparatus 11 shown in FIG. 1 and described with respect thereto. Tool body 48, including horn 50, end portion 52, and output base 54, can be substantially the same as or similar to tool body 18 shown in FIGS. 1 and 2 and described with respect thereto. Multi-tip tools 12 and 42 differ in the number, shape, and length of tips attached to tool bodies 18 and 48.

FIG. 5 shows tips 56 of varying lengths. Tips 56 are arranged across output base 54 in decreasing length with the longest and shortest tips disposed at opposite ends of output base 54. Tips 56 are disposed in parallel and parallel to longitudinal axis A. Multi-tip tool 42 is configured to be oriented with respect to a substantially planar workpiece surface, such that terminal ends 62 of tips 56 are disposed in a plane parallel to the planar workpiece surface. It will be understood by one of ordinary skill in the art that the relative lengths of tips 56 can vary depending on a shape of the workpiece and orientation of the multi-tip tool with respect to the workpiece. As shown in FIG. 4, workpiece 44 can be vane having an airfoil shape with curved surfaces. As shown, however, tips 56 are arranged in a row corresponding to a narrow, substantially planar, portion of the workpiece surface.

Tips 56 can include shaping portion 57 configured to define a shape of holes 46 in workpiece 44. Shaping portions 57 can include diffuser portion 58 and metering portion 60. Metering portion extends to terminal end 62. Diffuser portion 58 is disposed adjacent metering portion 60. Diffuser portion 58 can have a conical shape and metering portion 60 can have a cylindrical shape as shown in FIG. 5. In other embodiments, tips 56 can have other shapes, including but not limited to tips having a laidback diffuser portion, lobed diffuser portion, or Vehr type diffusion portion, as known in the art.

Longer tips 56 can additionally include extension portions 64 configured for attachment to output base 54. Extension portions 64 can be cylindrical, having a cross-section substantially matching an outmost extent or base of diffuser portion 58. Extension portions 64 can be provided to extend a length of tip 56 but are not intended to form a portion of holes 46 in workpiece 42. As previously described with respect to multi-tip tool 12 shown in FIGS. 1 and 2, the number, shape, and arrangement of tips 56 is not limited to that illustrated and can vary as needed to meet manufacturing requirements. In some embodiments, multiple rows of tips 56 can be provided on output base 54.

The magnitude of vibration amplitudes heavily depends on a mass of each tip 56. It is necessary to substantially balance the mass among all tips 56 to obtain a substantially uniform distribution of vibration amplitude over the output surface (terminal end 60) of each tip 56. FIGS. 6 and 7 illustrate two means for balancing the mass across output base 54 and with respect to longitudinal axis A, which can be used independently or can be combined. All tips 56 are configured to have approximately the same mass. As used herein, tips having "approximately the same mass" or a "substantially uniform mass distribution" or a "substantially balanced mass distribution" allows for variation that results in no greater than a 10 percent variation in the vibration amplitude at the output surface (terminal end 62) of tips 56.

FIG. 6 shows tips 56A-56C formed of materials of differing densities to balance the mass among all tips 56A-56C. Tip 56A, which is the longest and has the greatest volume can be formed of a material having a lower density than tips 56B and 56C. Tip 56C, having the shortest length and smallest volume, can be formed of a material having a higher density than tips 56A and 56C. Tip 56B, having a length and volume between that of tips 56A and 56C, can be formed of a material of intermediate density. For example, tip 56A can be formed of an aluminum alloy, tip 56B can be formed of a titanium alloy, and tip 56C can be formed of tool steel. As previously described, tips 56 do not contact workpiece surface 42 during operation but instead accelerate abrasive particles in a slurry provided between tips 56 and workpiece 42, which chip away the workpiece material. As such, tips 56 can be formed of a material softer than workpiece 42.

Alternatively, or in combination with providing tips 56 of differing material densities, a mass of tips 56 can be selectively reduced via material removal. To maintain a uniform tip shape, the mass distribution can be substantially balanced across output base 54 by making at least a subset of tips 56 or all of tips 56 hollow. FIG. 7 shows tips 56D-56F. Tips 56D-56F can be made of the same material. Tips 56D and 56E, which are longer and thereby heavier than tip 56F can be hollow or have an internal cavity to provide a substantially balanced mass distribution across output base 54 and with respect to the longitudinal axis of multi-tip tool 42. Wall thicknesses or cavity sizes can vary for each tip 56D and 56E as necessary to provide a tip mass approximately equal to a mass of tip 56F.

Tips 56 can be formed, for example, via known additive manufacturing processes with selected tip materials, shapes, and internal cavities. The shape, relative lengths, number, arrangement, and material of tips 56 is not limited to the embodiments shown. It will be understood by one of ordinary skill in the art that multi-tip tools can be designed with the teachings herein to accommodate varying hole configurations and manufacturing setups.

Figure 8:
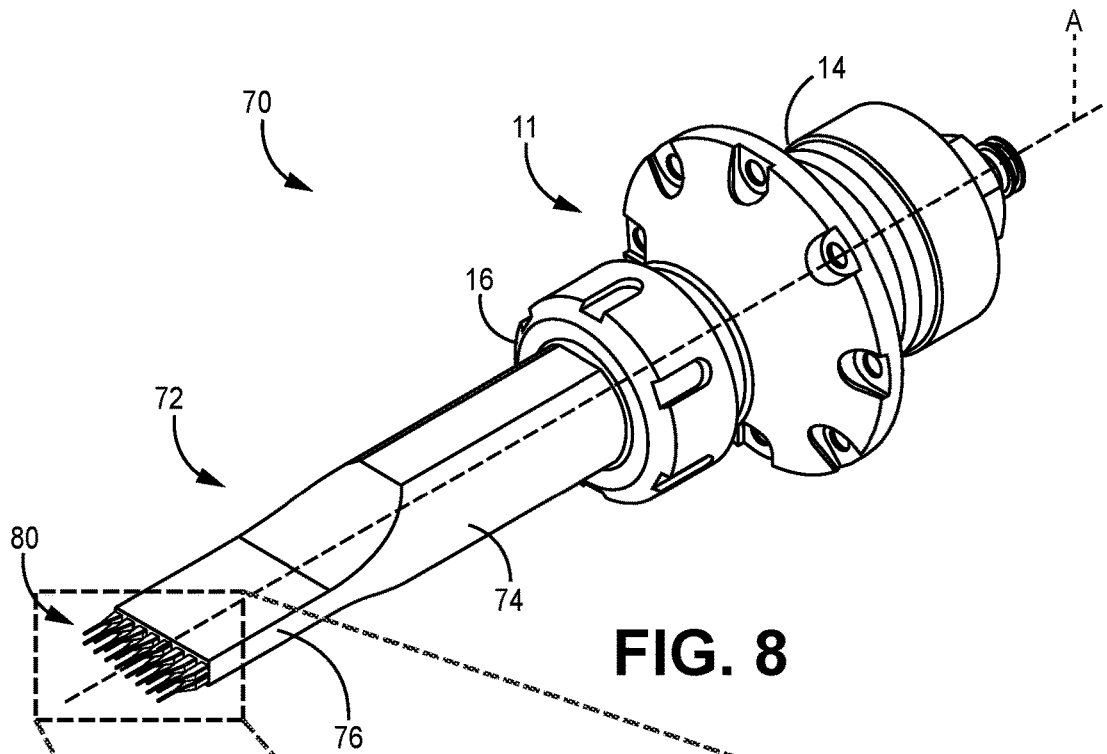
FIG. 8 is a perspective view of an ultrasonic impact grinding apparatus having another embodiment of a multi-tip tool.
Figure 9:
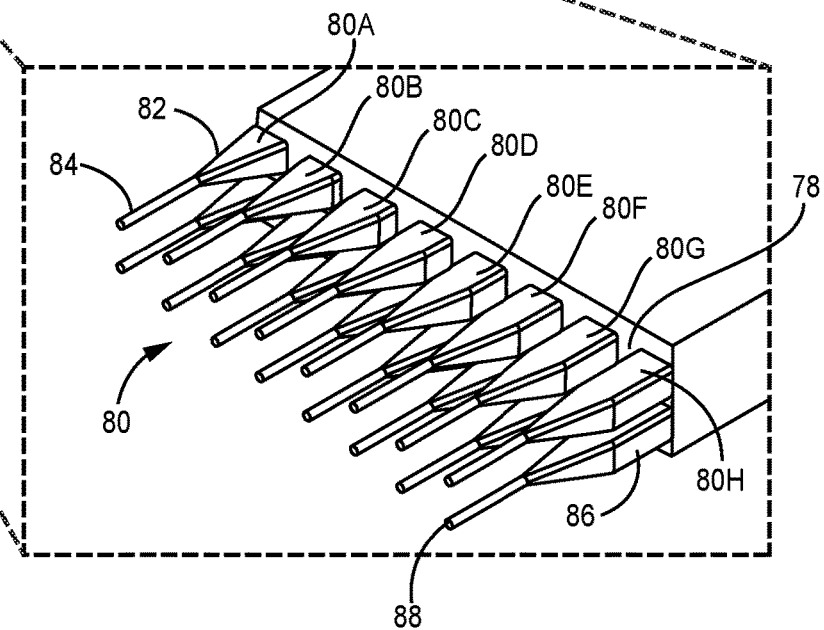
FIG. 9 is an enlarged view of the multi-tip tool of FIG. 8.

FIG. 8 is a perspective view UIG assembly 70 with UIG apparatus 11 of FIG. 1 and multi-tip tool 72. FIG. 9 is an enlarged view of multi-tip tool 72 of FIG. 8. UIG assembly 70, UIG apparatus 11, transducer 14, collet 16, multi-tip tool 72, tool body 74, end portion 76, output base 78, tips 80, diffuser portion 82, metering portions 84, extension portions 86, terminal ends 88, and longitudinal axis A are shown. Multi-tip tool 72 includes two rows of tips 80 with tips

80A-80H in each row arranged in increasing length from left to right. Tips 80 are uniformly spaced in each row and between rows. Tips 80 are disposed in parallel and parallel to longitudinal axis A.

Tool body 74 includes end portion 76 configured to amplify the vibration amplitude at output base 78 and provide a desired vibration amplitude input to tips 80. Tips 80 are configured and arranged to substantially balance a mass distribution across output base 78 and with respect to longitudinal axis A to achieve a substantially uniform vibration amplitude at an output surface (terminal end 88) of each tip 80. As previously described, each tip can have approximately the same mass to achieve a substantially balanced mass distribution. Tips 80A-80H can be formed of different materials and/or can include internal cavities as described with respect to tips 56A-56F shown in FIGS. 7 and 8.

Tips 80 have a laidback diffuser portion 82 and cylindrical metering portion 84 similar to tips 28 shown in FIGS. 1 and 2 and described with respect thereto. At least a subset of tips 80 (e.g., tips 80B-80H) can have extension portions 86 disposed adjacent to output base 78. Extension portions are intended to extend a length of tips 80B-80H, such that terminal ends 88 are disposed a uniform distance from a workpiece. Extension portions 86 can have a shape matching a base of diffuser portion 82. Extension portions 86 are not intended to form a portion of holes formed in the workpiece. In other embodiments, tips 80 can have other shapes, including but not limited to tips having a conical diffuser portion, lobed diffuser portion, or Vehr type diffusion portion, as known in the art.

High-performance ultrasonic machining on CMCs with multiple tool tips can be achieved by substantially balancing a mass distribution of the tool tips with respect to the longitudinal vibration axis to provide a substantially uniform vibration amplitude at an output surface of all tool tips. This can be achieved by any of the methods described herein or combinations thereof, including forming tips of materials having different material densities and forming hollow tips. By keeping all tool tips well balanced, it is feasible to use UIG to simultaneously machine multiple features together to improve material removal rate multifold.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A tool for ultrasonic impact grinding apparatus driven to vibrate along a longitudinal axis at an applied operating frequency includes a tool body disposed on the longitudinal axis, a first tip extending from an output end of the tool body, and a second tip extending in parallel to the first tip from the output end of the tool body. The first tip has a first length. The second tip has a second length greater than the first length. A mass of the first and second tip is substantially balanced across the output end of the tool body and with respect to the longitudinal axis.

The tool of the preceding paragraph can optionally include, additionally and/or alternatively, any one or more of the following features, configurations and/or additional components:

In an embodiment of the foregoing tool, the first tip and the second tip can be formed of different materials.

In an embodiment of any of the foregoing tools, the first tip can have a first overall tip density and the second tip can have a second overall tip density. The second overall tip density can be less than the first overall tip density.

In an embodiment of any of the foregoing tools, the second tip can include an internal cavity.

In an embodiment of any of the foregoing tools, the first tip and the second tip can be formed of the same material.

In an embodiment of any of the foregoing tools, the first tip and the second tip can have a substantially uniform longitudinal vibration amplitude at the applied operating frequency.

In an embodiment of any of the foregoing tools, the first tip and the second tip can have uniform shaping portions configured to define a shape of a hole formed in a workpiece.

In an embodiment of any of the foregoing tools, the first tip and the second tip can have extension portions of differing lengths, the extension portions disposed between the shaping portion and the output end of the tool body.

In an embodiment of any of the foregoing tools, the shaping portions can include a diffuser portion and a metering portion.

A tool for an ultrasound impact grinding apparatus driven to vibrate along a longitudinal axis at an applied operating frequency includes a tool body disposed on the longitudinal axis and a plurality of tips connected to an output end of the body. Each tip of the plurality of tips has a different length and a vibration amplitude of the plurality of tips is substantially uniform at the applied operating frequency.

The tool of the preceding paragraph can optionally include, additionally and/or alternatively, any one or more of the following features, configurations and/or additional components:

In an embodiment of the foregoing tool, a mass of the plurality of tips can be substantially balanced with respect to the output end and the longitudinal axis.

In an embodiment of any of the foregoing tools, the tips can be formed of different materials.

In an embodiment of any of the foregoing tools, the tips can have different material densities. The material density can decrease with increasing tip length.

In an embodiment of any of the foregoing tools, at least a subset of tips of the plurality of tips can have an internal cavity.

In an embodiment of any of the foregoing tools, tips of the plurality of tips can be uniformly spaced in one or more rows.

In an embodiment of any of the foregoing tools, tips of the plurality of tips can have uniform shaping portions configured to define a shape of a hole formed in a workpiece.

In an embodiment of any of the foregoing tools, at least a subset of tips of the plurality of tips can have extension portions of differing lengths. The extension portions can be disposed between the shaping portion and the end of the tool.

In an embodiment of any of the foregoing tools, the shaping portions can include a diffuser portion and a metering portion.

A method of conducting ultrasonic impact griding includes orienting a tool of an ultrasonic impact grinding apparatus at an angle relative to a workpiece and providing a uniform vibrational amplitude to all tips of the tool. The tool has a longitudinal axis and a plurality of tips of differing lengths. The ends of the tips are disposed an equal distance from a surface of the workpiece.

The method of the preceding paragraph can optionally include, additionally and/or alternatively, any one or more of the following features, configurations, additional components, and/or steps:

In an embodiment of the foregoing method, a mass of the plurality of tips can be substantially balanced with respect to the longitudinal axis.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A tool for ultrasonic impact grinding apparatus driven to vibrate along a longitudinal axis at an applied operating frequency, the tool comprising:
a tool body disposed on the longitudinal axis, the tool body comprising:
a horn configured to amplify a vibration amplitude, the horn having an output base at a terminal end;
a first tip extending from the output base, the first tip having a first length; and
a second tip extending in parallel to the first tip from the output base, the second tip having a second length, the second length greater than the first length;
wherein each of the first tip and the second tip has a shaping portion configured to define a shape of an aperture formed in the workpiece via ultrasonic impact grinding;
wherein the first tip and the second tip have first and second extension portions, respectfully, disposed between the shaping portion and the output base, wherein the first and second extension portions have the same shape and differ in length; and
wherein a mass of the first tip is substantially the same as the mass of the second tip to provide a substantially uniform mass distribution across the output base and with respect to the longitudinal axis.

2. The tool of claim 1, wherein the first tip and the second tip are formed of different materials.

3. The tool of claim 2, wherein the first tip has a first overall tip density and the second tip has a second overall tip density, the second overall tip density less than the first overall tip density.

4. The tool of claim 1, wherein the second tip is hollow, having an internal cavity.

5. The tool of claim 4, wherein the first tip and the second tip are formed of the same material.

6. The tool of claim 1, wherein the first tip and the second tip have a substantially uniform longitudinal vibration amplitude at the applied operating frequency.

7. The tool of claim 1, wherein the shaping portion includes a diffuser portion defined by an expanding section of each of the first and second tips and a metering portion defined by a cylindrical section of each of the first and second tips disposed adjacent to the expanding section, wherein a cross-section area of the expanding section increases outward from the cylindrical section, and wherein the expanding section is characterized by at least one of a polyhedral, lobed, or frustoconical shape.

8. The tool of claim 1, wherein the first and second tips are removably fastened to the output base.

9. A tool for an ultrasound impact grinding apparatus driven to vibrate along a longitudinal axis at an applied operating frequency, the tool comprising:
a tool body disposed on the longitudinal axis, the tool body comprising:
a horn configured to amplify a vibration amplitude, the horn having an output base at a terminal end; and
a plurality of tips extending from the output base, each tip of the plurality of tips having an extension portion disposed between the output base and a shaping portion, each respective shaping portion is configured to define a shape of an aperture formed in a workpiece via ultrasonic impact grinding, each respective extension portion having the same shape and a different respective length;
wherein tips of the plurality of tips have different material densities, the material density decreasing with increasing tip length and/or wherein at least a subset of tips of the plurality of tips are hollow with an internal cavity, a volume of the internal cavity increasing with increasing tip length; and
wherein a vibration amplitude of the plurality of tips is substantially uniform at the applied operating frequency.

10. The tool of claim 9, wherein a mass of each the plurality of tips is substantially the same such that a mass distribution of the plurality of tips is substantially uniform across the output end and with respect to the longitudinal axis.

11. The tool of claim 10, wherein the tips have different material densities, the material density decreasing with increasing tip length.

12. The tool of claim 9, wherein the tips are formed of different materials.

13. The tool of claim 9, wherein at least a subset of tips of the plurality of tips are hollow with an internal cavity.

14. The tool of claim 9, wherein tips of the plurality of tips are uniformly spaced in one or more rows.

15. The tool of claim 9, wherein tips of the plurality of tips have uniform shaping portions configured to define uniform aperture shapes in the workpiece.

16. The tool of claim 9, wherein the shaping portions include a polyhedral section configured to form a diffuser portion of the aperture and a cylindrical section configured to form a metering portion of the aperture, wherein the walls of the polyhedral section converge toward the cylindrical section.

17. The tool of claim 9, wherein each of the plurality of tips is removably fastened to the output base.

18. A method of conducting ultrasonic impact grinding, the method comprising:

providing the tool of claim 1;
orienting the tool of claim 1 at an angle relative to the workpiece wherein ends of the first and second tips are disposed an equal distance from a surface of the workpiece; and
providing an abrasive slurry between the first and second tips and the workpiece;
providing the vibrational amplitude to the first and second tips, the vibrational amplitude being substantially uniform; and
simultaneously forming apertures through the workpiece with the first and second tips.

\* \* \* \* \*